United States Patent [19]
Peck et al.

[11] Patent Number: 6,048,027
[45] Date of Patent: *Apr. 11, 2000

[54] VEHICLE SEAT WITH INTEGRAL CHILD RESTRAINT SEAT

[75] Inventors: Steven Peck, Highland; Matthew S. McMaster, Canton, both of Mich.

[73] Assignee: Lear Corporation, Southfield, Mich.

[ * ] Notice: Under 35 U.S.C. 154(b), the term of this patent shall be extended for 579 days.

[21] Appl. No.: 08/633,400

[22] Filed: Apr. 16, 1996

[51] Int. Cl.[7] .................................................. A47C 15/00
[52] U.S. Cl. ...................................... 297/238; 297/378.12
[58] Field of Search ............................... 297/238, 378.12

[56] References Cited

U.S. PATENT DOCUMENTS

| | | |
|---|---|---|
| 2,732,003 | 1/1956 | Williams . |
| 2,737,229 | 3/1956 | Semar . |
| 2,752,988 | 7/1956 | Marvin . |
| 2,864,432 | 12/1958 | Limberg . |
| 2,873,794 | 2/1959 | Leslie et al. . |
| 3,311,405 | 3/1967 | Brennan et al. . |
| 4,082,353 | 4/1978 | Hollowell . |
| 4,143,913 | 3/1979 | Rumpf . |
| 4,318,569 | 3/1982 | Bilenchi et al. . |
| 4,394,048 | 7/1983 | Sakurai et al. . |
| 5,100,202 | 3/1992 | Hughes . |
| 5,163,735 | 11/1992 | Aljundi . |
| 5,280,995 | 1/1994 | Elton . |
| 5,290,090 | 3/1994 | Bell et al. ............................... 297/238 |
| 5,312,156 | 5/1994 | Heussner et al. ........................ 297/238 |
| 5,332,284 | 7/1994 | Elton et al. ............................. 297/238 |
| 5,380,060 | 1/1995 | Sponsler et al. ............... 297/378.12 X |
| 5,383,707 | 1/1995 | Osenkowski et al. .................. 297/238 |
| 5,466,048 | 11/1995 | Fowler et al. ...................... 297/378.12 |

*Primary Examiner*—Peter M. Cuomo
*Assistant Examiner*—Stephen Vu
*Attorney, Agent, or Firm*—MacMillan, Sobanski & Todd, LLC

[57] ABSTRACT

A folding passenger seat assembly with integral child restraint for a motor vehicle includes a seat portion and a backrest portion hinged to the seat portion. A seat latch finger selectively locks the backrest portion in a vertical use position. A child seat is integrally recessed within the backrest portion and includes a hinged bottom cushion. The backrest portion and child seat are interlocked so that the bottom cushion of the child seat can only be deployed if the backrest portion is latched in its vertical use position. Conversely, the backrest portion cannot be folded down if the child seat is deployed. The child seat includes a throw bolt at its hinge point for constantly and unyieldingly locking the bottom cushion in its stowed condition until deliberately released therefrom. Such deliberate release is accomplished by a footrest actuator on the bottom cushion.

15 Claims, 5 Drawing Sheets

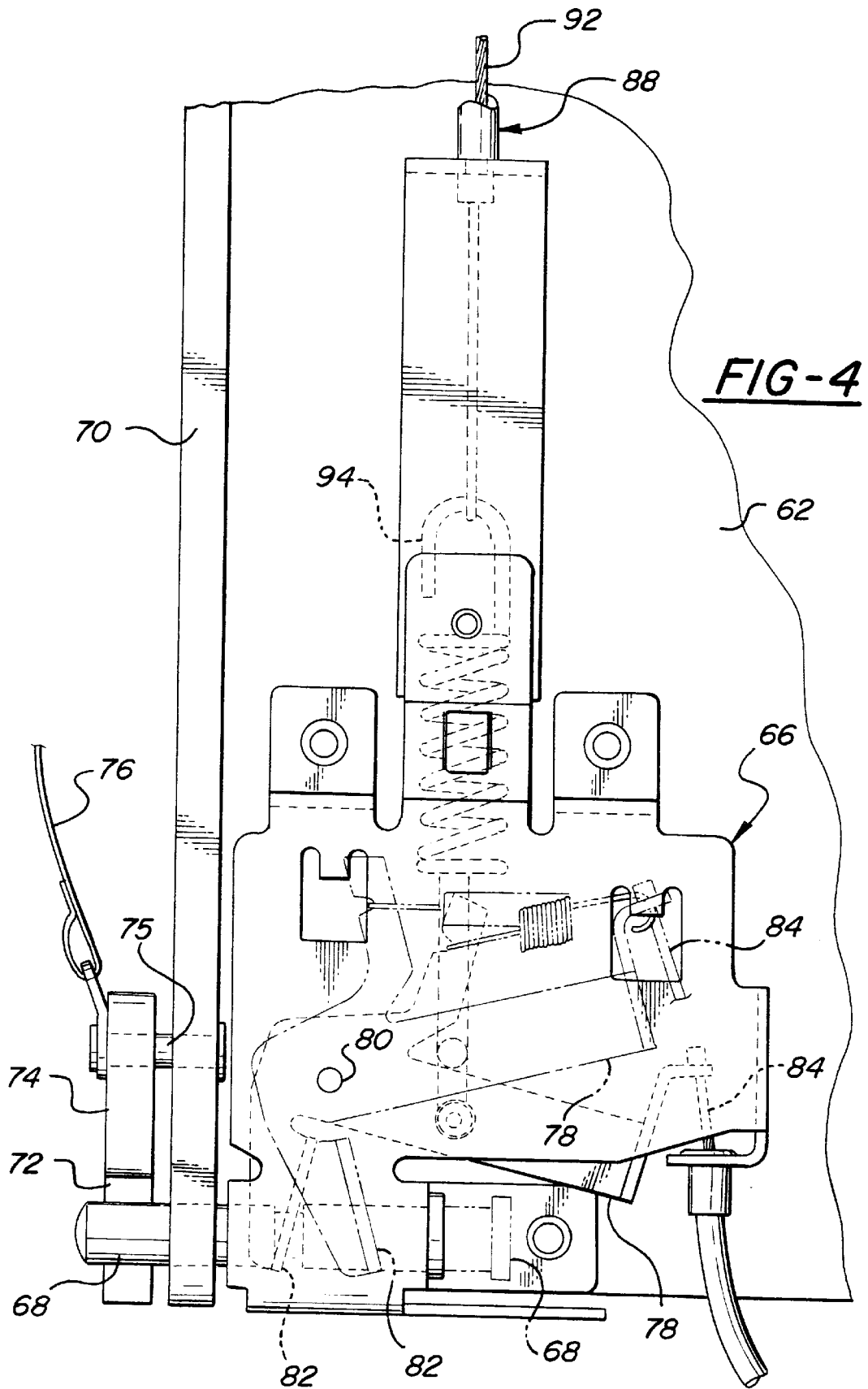

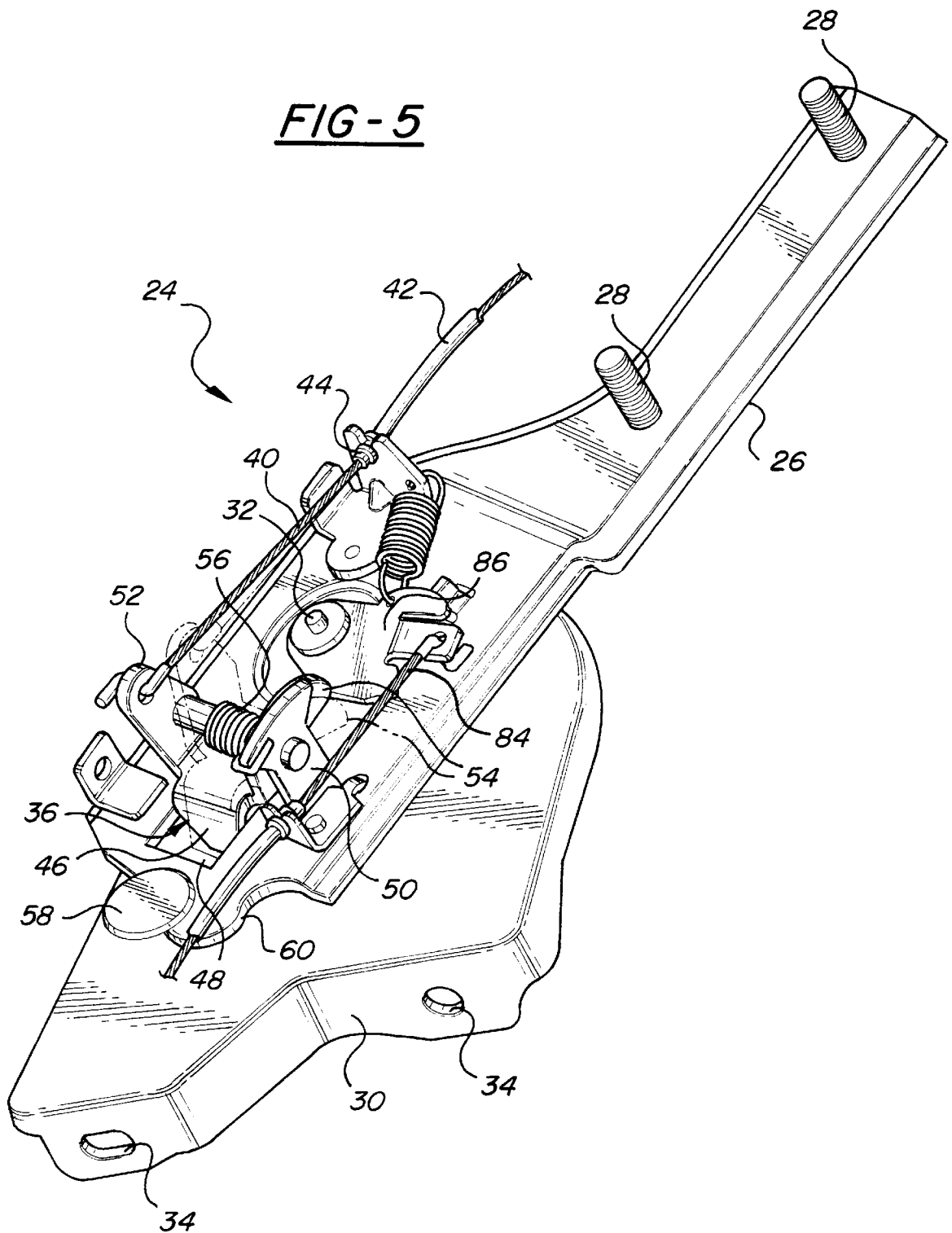

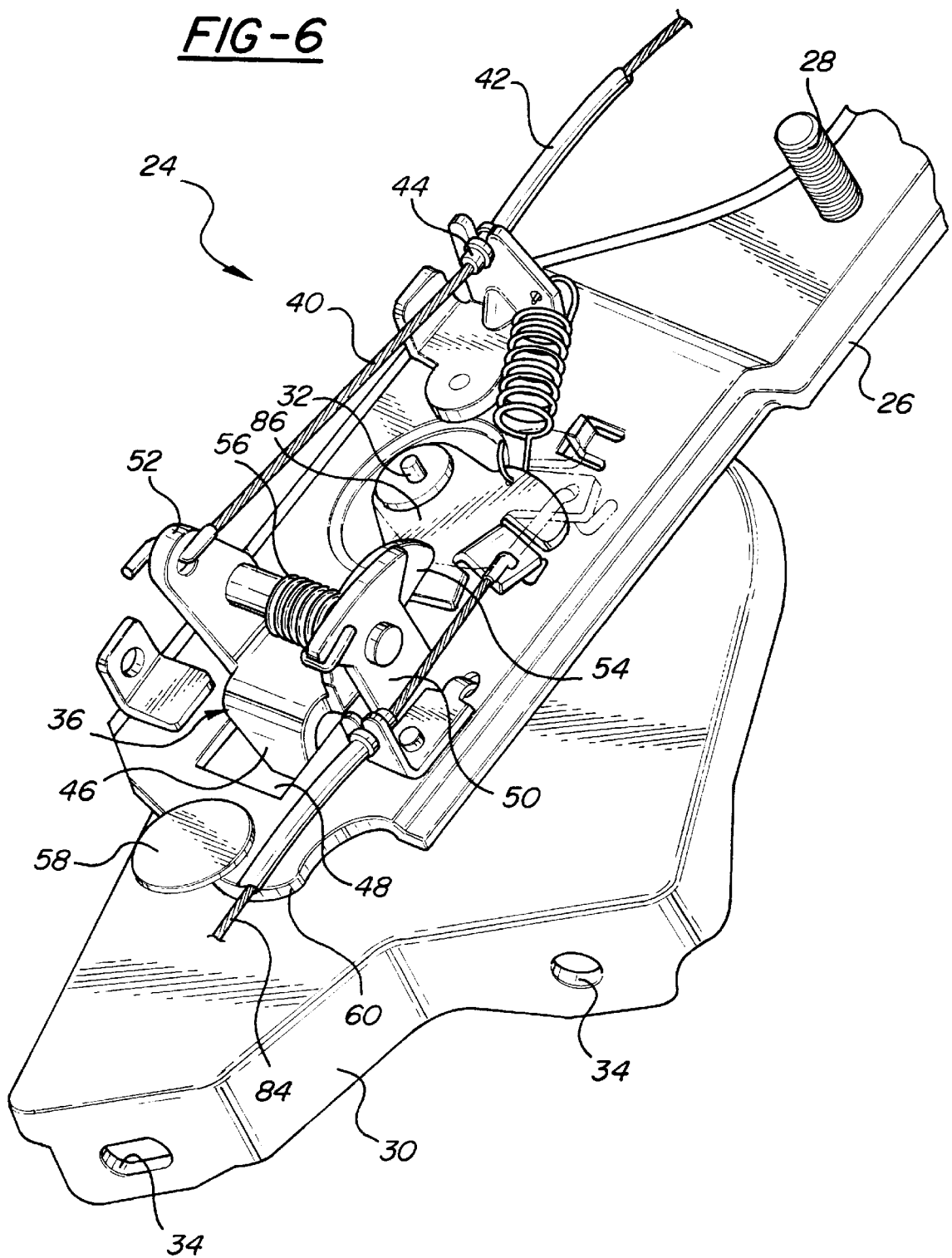

VEHICLE SEAT WITH INTEGRAL CHILD RESTRAINT SEAT

TECHNICAL FIELD

The subject invention relates to a vehicular seat assembly having an integral child restraint seat in the backrest portion, and more particularly to an improved latching mechanism to retain a bottom cushion of the child restraint seat in a stowed condition until deliberately released therefrom.

BACKGROUND OF THE INVENTION

Passenger seat assemblies in motor vehicles sometimes incorporate an integral child safety seat into the backrest portion. These integral child seats are a great convenience in view of the bulky prior art strap-in-place child seat, and because the vehicle seat can be quickly converted between child and adult use.

Integral child seats typically include a rear cushion recessed in the backrest portion of the main seat assembly. A bottom cushion of the child seat pivots between a stored position and a deployed position. In the stored position, the bottom cushion is folded flat against the rear cushion, forming a flush surface in cooperation with the backrest portion of the seat. In the deployed position, the bottom cushion extends generally perpendicularly from the backrest to support the buttocks and legs of the child. Examples of prior art vehicular seat assemblies including an integral child seat may be had in U.S. Pat. No. 5,286,084 to Bart, issued Feb. 15, 1994, 5,290,090 to Bell et al., issued Mar. 1, 1994, and U.S. Pat. No. 5,449,216 to Gierman et al., issued Sep. 12, 1995.

The bottom cushion is typically retained in the stowed position by a friction-type latch which is overcome or released simply by a pulling force. For example, as shown in U.S. Pat. No. 5,280,995 to Elton, issued Jan. 25, 1994, two latch levers freely release the bottom cushion of the child seat from the stowed position to the deployed position upon a simple pulling force applied to the bottom cushion whenever the backrest portion of the main seat assembly is in the upright use position. Also exemplary is U.S. Pat. No. 5,380,060 to Sponsler et al., issued Jan. 10, 1995, which discloses a child seat bottom cushion freely released to the deployed position whenever the backrest portion of the main seat assembly is in an upright use position.

A primary disadvantage of such prior art child seat assemblies which freely permit deployment of the bottom cushion, i.e., in which the friction-type latch is overcome or released simply by a pulling force, arises in a sudden deceleration condition where inertial forces alone can suddenly and unexpectedly cause deployment of the bottom cushion. This situation may potentially lead to the injury of adjacent passengers or animals.

SUMMARY OF THE INVENTION AND ADVANTAGES

The subject invention overcomes the disadvantages of the prior art and comprises a folding passenger seat assembly with integral child restraint for a motor vehicle. The assembly includes a seat portion, a backrest portion, and a hinge for arcuately moving the backrest portion relative to the seat portion between a generally vertical use position and a generally horizontal folded position. A seat latch selectively locks the backrest portion in the vertical use position. A child seat is integrally recessed within the backrest portion for securing a child therein. The child seat includes a bottom cushion pivotally moveable between a stowed position and a deployed position. An interlock permits movement of the bottom cushion from the stowed position only when the backrest portion is in the vertical use position. The interlock includes a manual lock for constantly and unyieldingly locking the bottom cushion in the stowed position when the backrest portion is in the vertical use position until deliberately released therefrom.

According to the improvement of the subject invention, the child seat will not freely permit deployment of the bottom cushion, i.e., the manual lock cannot be overcome or released simply by a pulling force. Therefore, during unexpected instances of sudden deceleration, the inertial forces acting on the bottom cushion will not suddenly cause deployment of the bottom cushion, thereby protecting adjacent passengers and animals from injury.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a front elevation view of the manual lock of FIG. 3;

FIG. 5 is a perspective view of the top and bottom bracket arms and the seat latch, with the seat latch shown in an unlocked condition it phantom; and FIG. 6 is a perspective view as in FIG. 5 showing the control plate actuated into an obstructing condition with respect to the latch finger.

DETAILED DESCRIPTION OF THE PREFERRED EMBODIMENT

Figure 1:
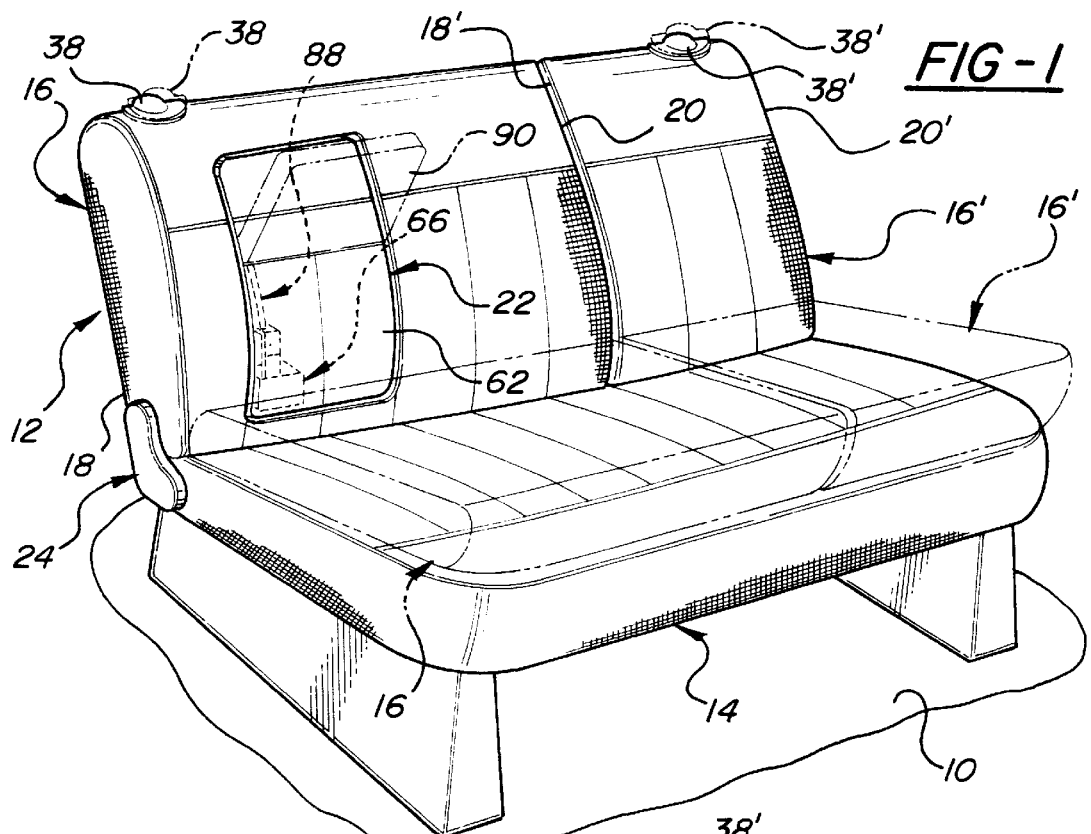
FIG. 1 is a simplified perspective view of a motor vehicle seat assembly according to the subject invention having two backrest portions shown in a generally vertical use position and folded to a generally horizontal folded position in phantom.
Figure 2:
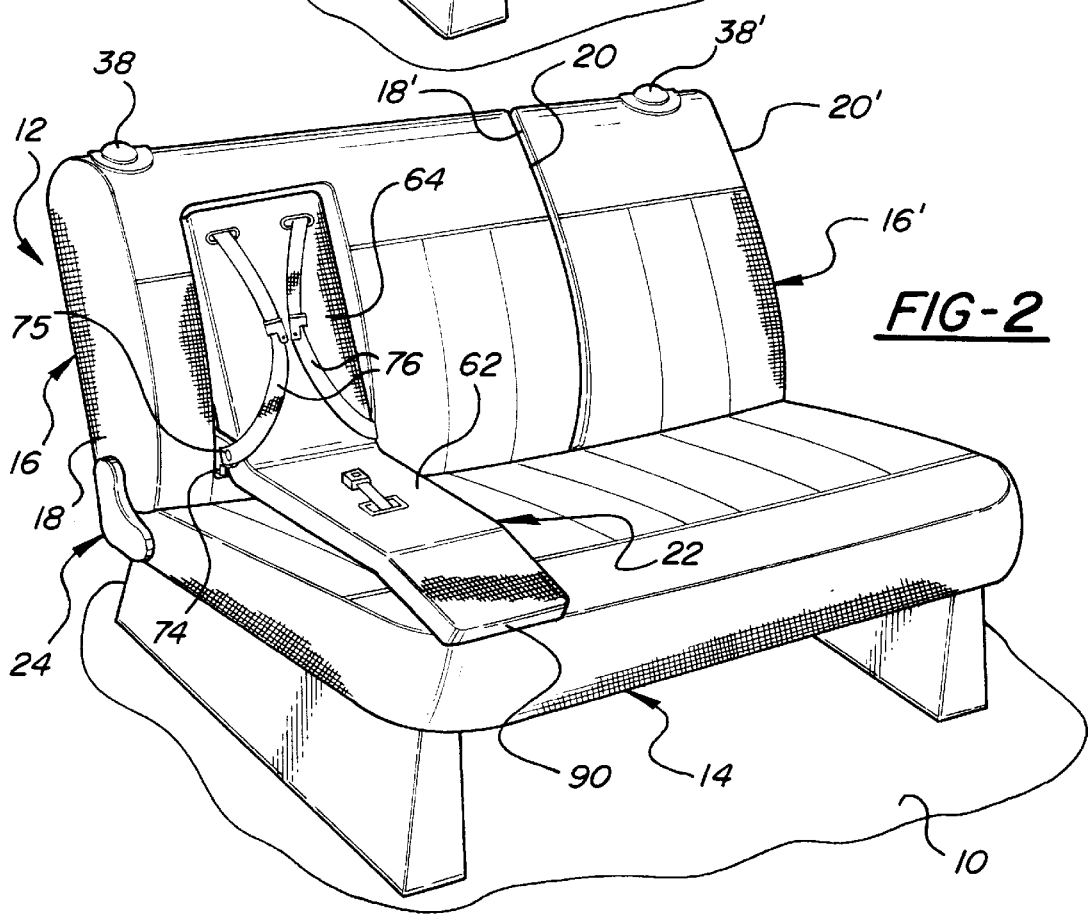
FIG. 2 is a perspective view as in FIG. 1 showing a bottom cushion of an integral child retraint seat opened to a deployed position.

Referring to the Figures, wherein like numerals indicate like or corresponding parts throughout the several views, the subject invention pertains to a typical motor vehicle having a passenger compartment, the floor of which is indicated at 10 in FIGS. 1 and 2. Secured to the floor 10 in the passenger compartment of the motor vehicle is a folding passenger seat assembly, generally shown at 12. The seat assembly 12 includes a seat portion, generally indicated at 14, and a backrest portion, generally indicated at 16. The backrest portion 16 has a left end 18 and a right end 20. As shown in FIG. 1, the backrest portion 16 may be of the so-called 60/40 split type including a companion backrest portion 16' of unequal length which can be independently manipulated. Alternatively, the backrest portion 16 may be of the traditional full length one piece type (not shown) which is coextensive with the seat portion 14.

In the case of the 60/40 split type, those skilled in the art will appreciate that both the backrest portion 16 and its companion backrest portion 16' will have a left end 18, 18' and a right end 20, 20', respectively, and that the subject invention may be practiced on either one or both of the backrest portions 16, 16'. However, the specific components of the seat assembly 12 which are described below with reference to the left end 18 or the right end 20 will generally be reversed in connection with the companion backrest portion 16'. This is because the outboard end of the backrest portion 16 is the left end 18, whereas the outboard end of the companion backrest portion 16' is the right end 20', as viewed from FIG. 1. Similarly, the inboard end of the backrest portion 16 is the right end 20, whereas the inboard end of the companion backrest portion 16' is the left end 18'. The backrest portion 16 shown in FIG. 1 preferably includes an integral fold-down child safety seat, generally indicated at 22.

The seat assembly 12 includes a hinge, generally indicated at 24 in FIGS. 5 and 6, for arcuately moving the backrest portion 16 relative to the seat portion 14 between a generally vertical use position and a generally horizontal folded position (shown in phantom in FIG. 1). The hinge 24 may take any of various forms known to those skilled in the art, but preferably includes a top bracket arm 26 fixedly attached to either one or both of the left 18 and right 20 ends of the backrest portion 16. A pair of threaded studs 28 extend from the top bracket arm 26 to facilitate connection to the backrest portion 16.

The hinge 24 also includes a bottom bracket arm 30 pivotally attached to the top bracket arm 26 by a hinge pin 32. Depending upon the particulars of the motor vehicle construction and the seat portion 14 construction, the bottom bracket arm 30 may be attached directly to the floor 10 in the passenger compartment, or attached to the seat portion 14, which in turn is attached to the floor 10. In FIGS. 5 and 6, the bottom bracket arm 30 is shown including a pair of mounting holes 34. Preferably, the top and bottom bracket arms 26, 30 are fabricated from a heavy gauge metal stamping.

A seat latch, generally indicated at 36 in FIGS. 5 and 6, is associated with the left end 18 of the backrest portion 16 for selectively locking the backrest portion 16 in the vertical use position. The seat latch 36 includes a seat release lever 38 disposed conveniently on the backrest portion 16. As shown in FIGS. 1 and 2, the seat release lever 38 may be positioned along the top edge of the backrest portion 16 for ready access to actuate the seat latch 36 so that the backrest portion 16 can be folded to a horizontal non-use position. Of course, those skilled in the art will readily appreciate various other mounting locations and possible alternative embodiments for the seat release lever 38. The companion backrest portion 16' includes a seat release lever 38' positioned along its top edge adjacent the right end 20' thereof.

A flexible motion transmitting seat latch cable 40 operatively extends from the seat release lever 38. The seat latch cable 40 is preferably disposed within a protective sheath-like conduit 42. The conduit 42 may be of the composite type having an inner tubular liner defining the internal boundaries of a core passage, at least one metallic supportive lay wire wrapped helically about the liner, and an outer cover disposed about the lay wire. The conduit 42 includes an end fitting 44 attached in a small holder or bracket on the top bracket arm 26. As the seat release lever 38 is manipulated, shown in phantom in FIG. 1, the seat latch cable 40 is tensioned and displaced within the conduit 42, thus causing the end of the seat latch cable 40 extending from the end fitting 44 to be drawn into the conduit 42.

In FIGS. 5 and 6, the seat latch 36 is shown including a latch finger 46 moveably supported on the top bracket arm 26. A catch 48 is formed in the bottom bracket arm 30 for trapping the latch finger 46 in a locked condition to lock the backrest portion 16 in the vertical use position. That is, when the latch finger 46 is seated in the catch 48, the top 26 and bottom 30 bracket arms are immobilized relative to one another such that no rotation about the hinge pin 32 is possible. This, in turn, locks the left end 18 of the backrest portion 16 in the vertical use position.

The latch finger 46 is pivotally carried on a yoke support 50 which, in turn, is fixedly mounted on the top bracket arm 26. A crank 52 extends from the latch finger 46 along with an interlock tab 54. The yoke support 50 includes a return spring 56 for continuously urging the latch finger 46 toward the locked condition seated in the catch 48. The seat latch cable 40 includes an S-shaped (or other) terminal operatively connected to the crank 52 for controlling movement of the latch finger 46. That is, as the seat release lever 38 is manipulated, the seat latch cable 40 is drawn into the conduit 42, causing the crank 52 to pivot the latch finger 46 out of the catch 48 so that the backrest portion 16 can be folded to the non-use position. A post 58 extending from the bottom bracket arm 30 abuts a hook 60 on the top bracket arm 26 to prevent hyper-extension of the backrest portion 16.

The seat assembly 12 may include an inertial latch (not shown) or a free pivoting latch (not shown) on the opposite end 18, 20 of the backrest portion 16 from the seat latch 36. As well known to those skilled in the art, an inertial latch may include a pendulum and a stop ledge to abut the pendulum whenever the pendulum has been rotated forwardly due to inertial forces caused by sudden deceleration.

The child seat 22 is integrally recessed within the backrest portion 16 for securing a child therein. The child seat 22 includes a bottom cushion 62 pivotally moveable between a stowed position and a deployed position (FIG. 1), and a rear cushion 64 adjacent the bottom cushion 62. An interlock, generally indicated at 66 in FIGS. 3 and 4, permits movement of the bottom cushion 62 from the stowed position only when the backrest portion 16 is in the vertical use position as shown in FIGS. 1 and 2. This is required for safety reasons to make certain that the backrest portion 16 is securely restrained in the vertical use position before the child seat 22 is used to carry a child.

Figure 3:
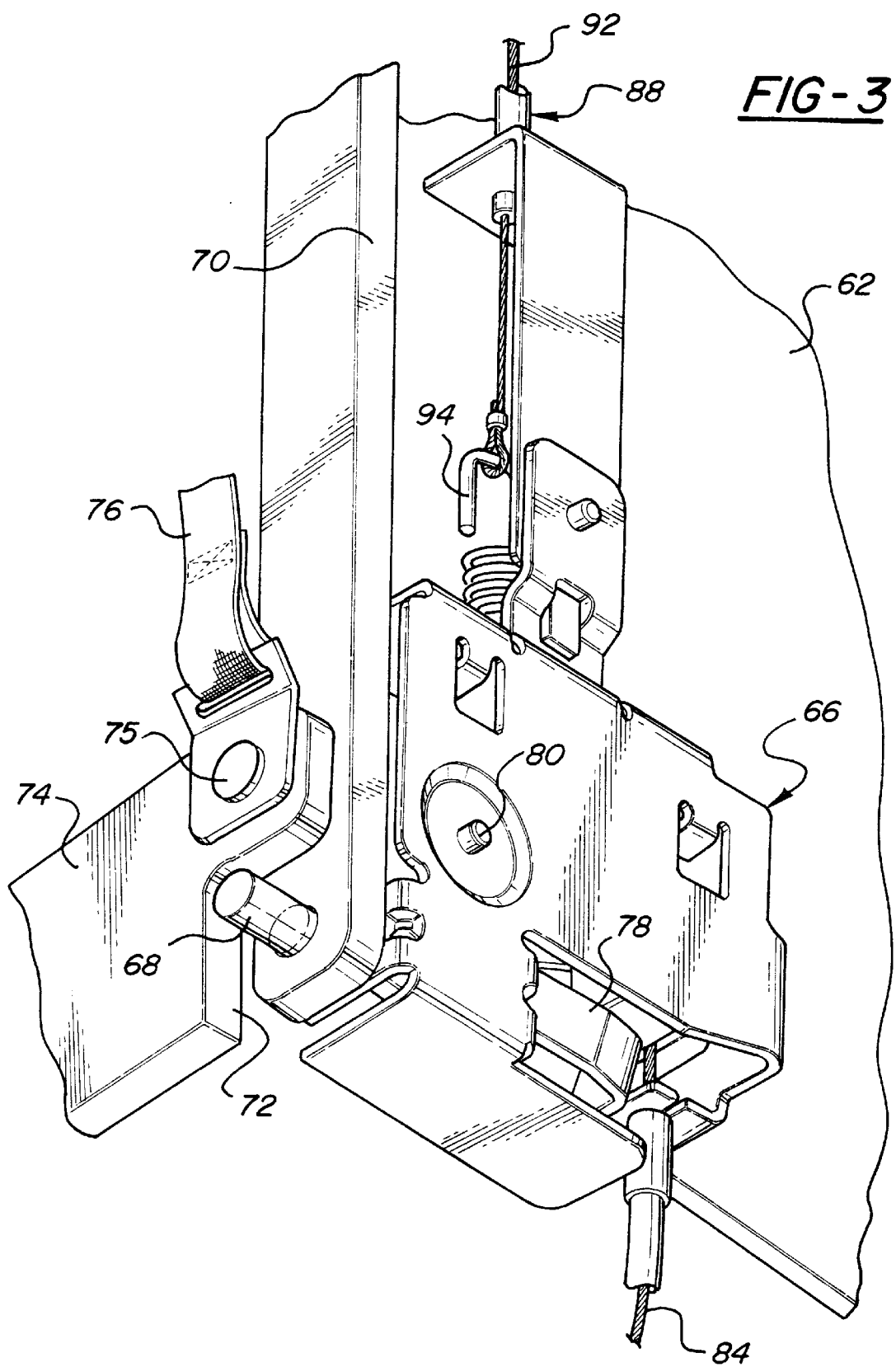
FIG. 3 is a perspective view of the manual lock of the subject invention as it is attached to the underside of the bottom cushion.

The interlock 66 includes a cylindrical throw bolt 68 disposed on the underside of the bottom cushion 62 as best shown in FIGS. 3 and 4. The throw bolt 68 is supported for linear reciprocating movement through a hole in a side frame member 70 of the bottom cushion 62. When fully extended, and when the bottom cushion 62 is in the stowed position, the throw bolt 68 abuts an edge 72 of a cantilevered support bar 74 extending from the backrest portion 16 to lock or restrain. The bottom cushion 62 is hingedly supported on the support bar 74 by way of a pin 75. It will be appreciated that while only one throw bolt 68 is required to securely lock or restrain the bottom cushion 62 in the stowed position, an identical support bar and pin arrangement is provided on the opposite end of the bottom cushion 62. One strap of the seat belt 76 may be secured on the pin 75.

The interlock includes a bell crank 78, which is pivoted about an axle 80. The bell crank 78 is operatively connected to the throw bolt 68 at a saddle connection 82. Therefore, as the bell crank 78 pivots about the axle 80, the throw bolt 68 is reciprocated between the extended (solid) and retracted (phantom) positions shown in FIGS. 3 and 4. In the extended position, which can only be achieved when the bottom cushion 62 is in the stowed position, the throw bolt 68 abuts the edge 72 of the support bar 74 thereby preventing deployment of the bottom cushion 62 because the throw bolt 68 is placed in shear between the side frame member 70 of the bottom cushion 62 and the support bar 74. Only when the throw bolt 68 is in the retracted position may the bottom cushion 62 be deployed to the position shown in FIG. 2.

The interlock further includes an interlock cable 84 operatively extending from the bell crank 78, as shown in FIGS. 3–4. The interlock cable 84 is routed through the bottom cushion 62 and through the backrest portion 16 to the hinge 24 adjacent the seat latch 36, where the opposite end of the interlock cable is attached to a control plate 86. The control plate 86 is pivotally carried on the hinge pin 32, as shown in FIGS. 5 and 6. When the bell crank 78 and throw bolt 68 are in the extended (or unactuated) position, the control plate 86 is positioned in the neutral position as shown in FIG. 5 and in phantom in FIG. 6. However, when the bell crank 78 and throw bolt 68 are moved to the retracted (or actuated) position, the interlock cable 84 is tensioned, causing the control plate 86 to be pivotally displaced to the obstructing position shown in solid in FIG. 6. In this obstructing position, the control plate 86 seats behind the interlock tab 54 of the latch finger 46, preventing it from fully rotating out of registry with the catch 48 and thereby precluding actuation of the seat latch 36. Accordingly, whenever the bottom cushion 62 of the child seat 22 is deployed, thus moving the throw bolt 68 and the bell crank 78 to the retracted position, the control plate 86 moves into an obstructing position preventing the backrest portion 16 from being folded to the horizontal position shown in phantom in FIG. 1.

Conversely, when the bottom cushion 62 of the child seat 22 is in the stowed position and the throw bolt 68 and bell crank 78 are in the extended position, with the control plate 86 in the neutral position, movement of the backrest portion 16 from the vertical use position causes the latch finger 46 to move out of registry with the catch 48. If this is the case, the interlock tab 54 will be held in a deflected condition (shown in phantom in FIG. 5), thereby preventing movement of the control plate 86 from the neutral position. By preventing displacement of the control plate 86 from the neutral position, the interlock cable 84 is immobilized, thus precluding movement of the bell crank 78 and the throw bolt 68, which in turn immobilizes the child safety seat 22 in the stowed position. However, when the backrest portion 16 is returned to the vertical use position, the latch finger 46 will automatically snap into the catch 48, once again locking the backrest portion 16 in the vertical use position and permitting movement of the control plate 86 from its neutral position.

The interlock further includes a manual lock, generally indicated at 88 in FIGS. 3 and 4, for constantly and unyieldingly locking the bottom cushion 62 in the locked condition when the backrest portion 16 is in the vertical use position until deliberately released therefrom. In other words, the manual lock 88 precludes deployment of the bottom cushion 62 when the backrest portion 16 is in the vertical use position, until a deliberate and forceful manipulation is made to move the throw bolt 68 to the retracted position. In this manner, the the bottom cushion 62 will not freely deploy, i.e., the throw bolt 68 will not retract, simply by a forwardly acting force on the bottom cushion 62. Therefore, during unexpected instances of sudden vehicle deceleration, the inertial forces acting on the bottom cushion 62 will not overcome the manual lock 68 and suddenly deploy the bottom cushion 62, thereby protecting adjacent passengers, animals and property from injury.

The manual lock 88 includes a remote child actuator spaced from the throw bolt 68 for manually releasing the bottom cushion 62 from the stored position. The remote child actuator includes a footrest actuator 90 pivotally extending from the bottom cushion 62 of the child seat 22. As shown in FIG. 1, the footrest actuator 90 is manually pivoted approximately 45° to move the throw bolt 68 from the extended position to the retracted position. The bottom cushion 62 can only be deployed by initial manipulation of the footrest actuator 90.

A flexible motion transmitting child cable 92 operatively extends between the footrest actuator 90 and the retractable throw bolt 68. Although not shown in the drawings, the child cable 92 is connected to a lever or crank type pulley mechanism on the footrest actuator 90, as will be understood by those skilled in the art, so that as the footrest actuator 90 is displaced (FIG. 1), the child cable 92 is tensioned. An over travel protection spring 94 is disposed along the child cable 92 to guard against over tensioning. The end of the over travel protection spring 94 is operatively connected to the bell crank 78, so that as the footrest actuator 90 is pulled to the position shown in phantom in FIG. 1, the child cable 92 and the spring 94 pivot the bell crank 78 counter-clockwise to the position shown in phantom in FIG. 4. This motion of the bell crank 78 retracts the throw bolt 68, thus allowing the bottom cushion 62 to be deployed. Therefore, the bell crank 78 effectively controls both the interlock 66 and the seat latch 36.

As mentioned above, when the backrest portion 16 is moved from the vertical use position so that the latch finger 46 is held out of registry with the catch and the associated interlock tab 54 is held in a deflected condition (FIG. 5), the control plate 86 is blocked in the neutral position. Therefore, if an attempt is made to deploy the bottom cushion 62 of the child seat 22, the immobilized interlock cable 84 will preclude movement of the bell crank 78 and the throw bolt 68, and the child safety seat 22 will remain in the stowed position. However, when the backrest portion 16 returns to the vertical use position, the latch finger 46 automatically snaps into the catch 48, and the interlock tab 54 lifts out of the blocking position with respect to the control plate 86 so that it may move to away from the neutral position and thereby allow retraction of the throw bolt 68.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A folding passenger seat assembly with integral child restraint for a motor vehicle, said assembly comprising: a seat portion; a backrest portion; a hinge for arcuately moving said backrest portion relative to said seat portion between a generally vertical use position and a generally horizontal folded position; a seat latch for selectively locking said backrest portion in said vertical use position; a child seat integrally recessed within said backrest portion for securing a child therein, said child seat including a bottom cushion pivotally moveable between a stowed position and a deployed position; an interlock for permitting movement of said bottom cushion from said stowed position only when said backrest portion is in said vertical use position; said interlock including a manual lock for constantly and unyieldingly locking said bottom cushion in said stowed position when said backrest portion is in said vertical use position until deliberately released therefrom, said manual lock including a remote child actuator for deliberately releasing said manual lock while said bottom cushion remains in said stowed position to allow subsequent movement of said bottom cushion toward said deployed position.

2. An assembly as set forth in claim 1 wherein said interlock includes a retractable throw bolt.

3. An assembly as set forth in claim 2 wherein said manual lock includes a flexible motion transmitting child cable operatively extending between said remote child actuator and said retractable throw bolt.

4. An assembly as set forth in claim 3 wherein said interlock includes a bell crank interconnecting said throw bolt and said child cable.

5. An assembly as set forth in claim 4 wherein said remote child actuator includes a footrest actuator pivotally extending from said bottom cushion of said child seat.

6. An assembly as set forth in claim 5 wherein said remote child actuator includes an over travel spring disposed along said child cable.

7. An assembly as set forth in claim 4 wherein said interlock includes an interlock cable operatively extending between said seat latch and said manual lock.

8. An assembly as set forth in claim 7 wherein said interlock includes a control plate.

9. An assembly as set forth in claim 8 wherein said control plate is pivotally carried on said hinge.

10. An assembly as set forth in claim 8 wherein said hinge includes a bottom bracket arm pivotally attached to a top bracket arm by a hinge pin.

11. An assembly as set forth in claim 10 wherein said seat latch includes a latch finger moveably supported on one of said top and bottom bracket arms, and a catch fixedly disposed in the other of said top and bottom bracket arms for trapping said latch finger in a locked condition to restrain said backrest portion in said vertical use position.

12. An assembly as set forth in claim 11 wherein said latch finger includes an interlock tab operatively engagable with said control plate.

13. An assembly as set forth in claim 12 wherein said seat latch includes a seat release lever for releasing said backrest portion from said vertical use position.

14. An assembly as set forth in claim 3 wherein said seat latch includes a seat latch cable operatively connecting said seat release lever and said latch finger.

15. An assembly as set forth in claim 3 wherein said child seat includes a rear cushion adjacent said bottom cushion.

* * * * *

UNITED STATES PATENT AND TRADEMARK OFFICE
CERTIFICATE OF CORRECTION

PATENT NO. : 6,048,027
DATED : April 11, 2000
INVENTOR(S) : Peck, et al.

It is certified that error appears in the above-identified patent and that said Letters Patent is hereby corrected as shown below:

<u>Title page,</u>
[*] delete "579" and insert -- 43 --.

Signed and Sealed this

Sixteenth Day of October, 2001

Attest:

*Nicholas P. Godici*

NICHOLAS P. GODICI
*Acting Director of the United States Patent and Trademark Office*

*Attesting Officer*

UNITED STATES PATENT AND TRADEMARK OFFICE
CERTIFICATE OF CORRECTION

PATENT NO. : 6,048,027
DATED : April 11, 2000
INVENTOR(S) : Steven Peck, Matthew S. McMaster Page 1 of 1

It is certified that error appears in the above-identified patent and that said Letters Patent is hereby corrected as shown below:

<u>Column 8, claim 14,</u>
Please change the number "3" to -- 13 --.

Signed and Sealed this

Twenty-seventh Day of November, 2001

Attest:

NICHOLAS P. GODICI
*Attesting Officer*   *Acting Director of the United States Patent and Trademark Office*